United States Patent
Varnavas et al.

(10) Patent No.: US 11,533,243 B2
(45) Date of Patent: Dec. 20, 2022

(54) METHOD FOR COMPUTING ENVIRONMENT SPECIFIC BASELINES FOR METRICS OF USER EXPERIENCE

(71) Applicant: Citrix Systems, Inc., Fort Lauderdale, FL (US)

(72) Inventors: Andreas Varnavas, Patras (GR); Kiran Kumar, Karnataka (IN); Venkatesh Vellingiri, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 41 days.

(21) Appl. No.: 17/004,945

(22) Filed: Aug. 27, 2020

(65) Prior Publication Data

US 2022/0021593 A1    Jan. 20, 2022

(30) Foreign Application Priority Data

Jul. 16, 2020 (IN) .............................. 202041030279

(51) Int. Cl.
*H04L 43/08*    (2022.01)
*G06K 9/62*    (2022.01)
(Continued)

(52) U.S. Cl.
CPC ............. *H04L 43/08* (2013.01); *G06K 9/6215* (2013.01); *G06K 9/6228* (2013.01); *G06N 20/00* (2019.01); *H04L 43/16* (2013.01)

(58) Field of Classification Search
CPC ....... H04L 43/08; H04L 43/16; G06K 9/6215; G06K 9/6228; G06N 20/00
See application file for complete search history.

(56) References Cited

U.S. PATENT DOCUMENTS 10,230,597 B2 *  3/2019  Parandehgheibi ........................... G06F 16/24578
10,708,152 B2 *  7/2020  Kulshreshtha ........ H04L 41/145
(Continued)

OTHER PUBLICATIONS

Hafsaoui A et al: "A fine-grained response time analysis technique in heterogeneous environments", Computer Networks, Elsevier, Amsterdam, NL, vol. 130, Nov. 16, 2017 (Nov. 16, 2017), pp. 16-33, XP085330659, ISSN: 1389-1286, DOI: 10.1016/J.COMNET.2017.11.006.
(Continued)

*Primary Examiner* — Philip C Lee
(74) *Attorney, Agent, or Firm* — Foley & Lardner LLP

(57) ABSTRACT

Described embodiments provide systems, methods, and computer readable media for generating environment descriptors. A device having at least one process may identify a plurality of feature vectors. Each vector may describe a corresponding access to an application hosted on a server in one of a plurality of network environments and having a corresponding performance metric. The device may provide a performance model using the plurality of feature vectors and the corresponding performance metrics. The performance model may be used to determine expected performance metrics for at least a first network environment. A first environment descriptor of the expected performance metrics may be generated for at least the first network environment. The first environment descriptor of the expected performance metrics may be used to assess a measured performance metric or a second environment descriptor of a second network environment.

18 Claims, 11 Drawing Sheets

(51) Int. Cl.
    *G06N 20/00*     (2019.01)
    *H04L 43/16*     (2022.01)

(56) References Cited

U.S. PATENT DOCUMENTS

| | | |
|---|---|---|
| 10,873,794 B2 * | 12/2020 | Kulshreshtha .......... H04L 43/04 |
| 2018/0307712 A1 | 10/2018 | Baradaran et al. |
| 2018/0316707 A1 | 11/2018 | Dodson et al. |
| 2019/0037002 A1 | 1/2019 | Arunachalam et al. |

OTHER PUBLICATIONS

International Search Report on Written Opinion on PCT Appl. No. PCT/US2021/041536 dated Oct. 26, 2021.

* cited by examiner

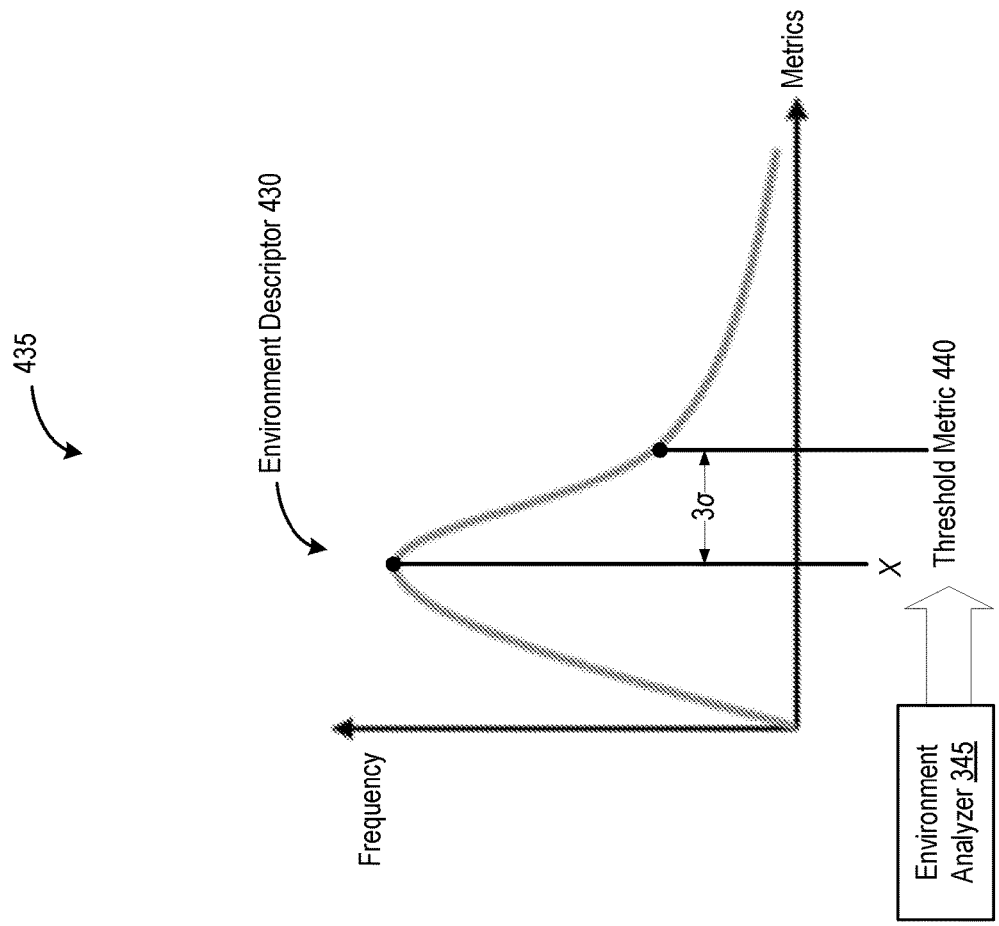

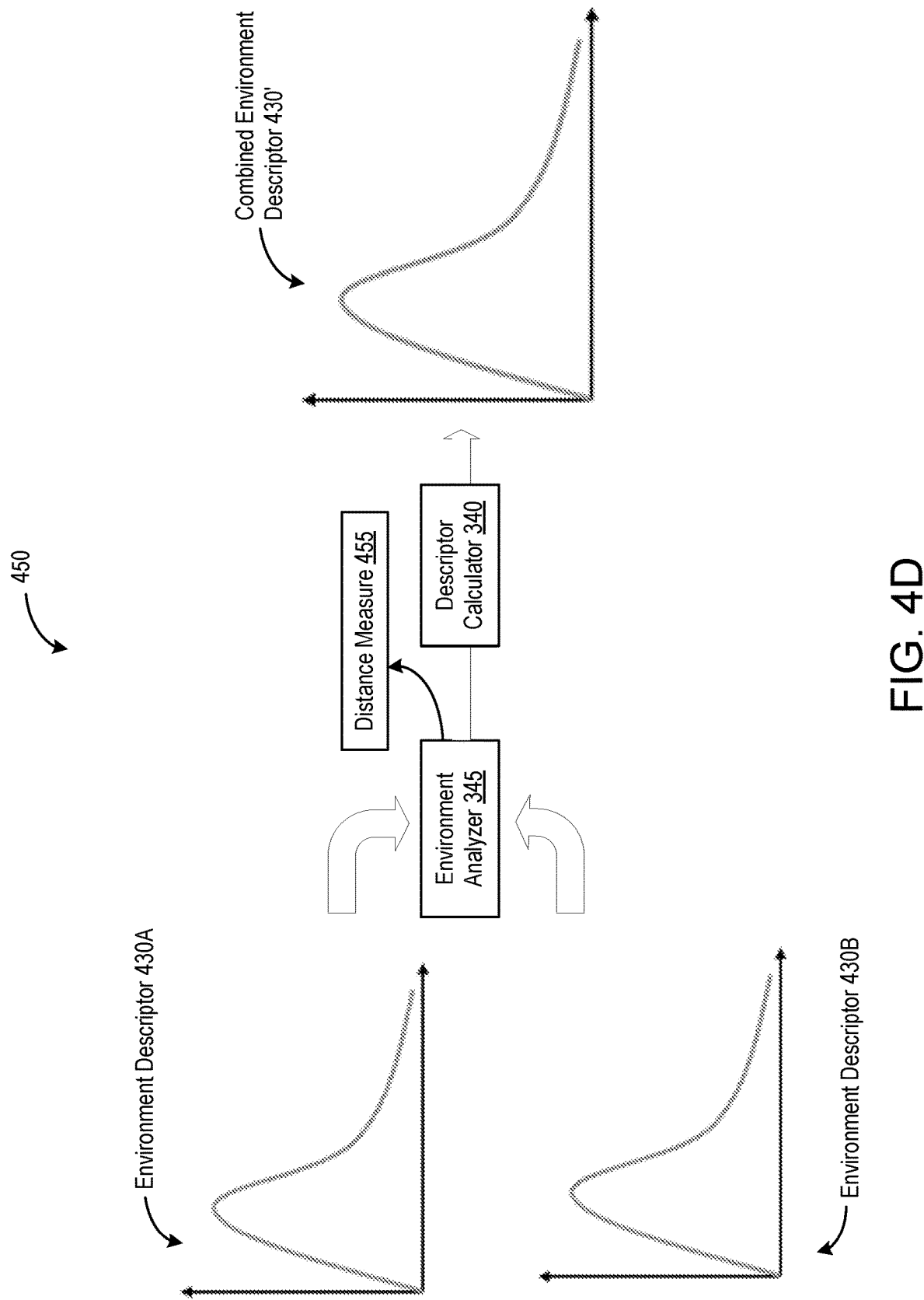

METHOD FOR COMPUTING ENVIRONMENT SPECIFIC BASELINES FOR METRICS OF USER EXPERIENCE

CROSS-REFERENCE TO RELATED APPLICATION

This application claims priority to and the benefit of Indian Provisional Patent Application No. 202041030279, titled "METHOD FOR COMPUTING ENVIRONMENT SPECIFIC BASELINES FOR METRICS OF USER EXPERIENCE," and filed on Jul. 16, 2020, the contents of all of which are hereby incorporated herein by reference in its entirety for all purposes.

FIELD OF THE DISCLOSURE

The present application generally relates to instrumenting performance, including but not limited to systems and methods for generating environment descriptors for network environments.

BACKGROUND

A client may access a resource hosted on a service via a networked environment. An instrumentation service may monitor the client accessing the service over the networked environment to measure various performance metrics.

SUMMARY

Clients belonging to different enterprises (e.g., a customer) may access various resources hosted on remote network environments (e.g., a cloud-based service) for applications running on such clients. In accessing the network environments, these applications, clients, and enterprises may be subject to various operating constraints and thus may experience differing performance metrics, such as an application launch time, response time, and frequency of transactions, among others. Within individual enterprises, the performance metrics of the clients and the applications running thereon may vary. In addition, the performance metrics across different enterprises may vary. Under one approach, to assess the performance, a monitoring service may measure various metrics of each individual application or client in accessing the network environment. Although a multitude of metrics may be collected, such a service may lack the capability of formulating metrics for individual enterprises as a whole.

The administrator for an enterprise that accesses the remote environment may desire to be able to monitor and assess various performance metrics that the users experienced when accessing resources of the remote environment. Some of the assessments may include: (1) whether the observed launch duration times of the users of an enterprise are aligned with the expected launch duration times when the type of environment is taken into account; (2) what is the baseline of launch duration time for the type of environment for the enterprise; (3) whether enterprises in the same sector have the same type of environment for their users; (4) whether the observed launch times of the users from one enterprise are aligned with the observed launch times of users from another enterprise with similar types of environments.

The environment of the enterprise, as far as the relevant characteristics may be concerned, may depend on a number of factors. Examples of such factors may include: a number of active users, a distribution of launch requests over a time period, a variance in the remote applications accessed by the launch, and the amount of resources available to users (e.g., processor, memory, and network round trip time (RTT)). One approach may be to produce a descriptor for an enterprise based on the above metrics. However, modeling at an enterprise level may be challenging. For one, such a modeling may involve aggregating behavior of a multitude of launch events. For another, it may be difficult to use the observed duration times of individual launch events to build the model in such a way that the launch durations are relevant.

To address these and other technical challenges, an environmental descriptor may be generated to define the network environments to enable the assessment of the performance metrics and comparison among the enterprises. To that end, the relevant characteristics of launch durations in an enterprise environment may be captured by: (1) modeling at the level of individual launch events across different users of the enterprise; (2) applying the model on the launch events of individual enterprises; and (3) with respect to an individual enterprise, building the descriptor by aggregating the output of the model in the form of a distribution (e.g., a histogram).

First, to train the model, a feature vector may be constructed for each launch event. The features may describe or identify: (a) the resources provided to the event (e.g., processor availability, memory utilization, and network round trip time) and (b) the type of remote application launched, among others. Categorical features can be built for the type of application by grouping together applications expected to have a similar performance metric (e.g., launch time). A coarse categorization may include a virtual desktop, a virtual application, and a Software as a Service (SaaS) or web application, among others. Virtual desktops may be further split into subcategories, such as pooled or dedicated desktops.

Second, taking into account the launch events across different enterprises, a function for the model that maps the feature vector to the expected launch duration time of the event may be learned. The learning may be performed in a supervised manner, using observed launch events across customers (e.g. using a regression decision tree). Third, with respect to each individual enterprise, the function may be applied to all the launch events of the enterprise over a time window. In this manner, a distribution of expected launch durations (e.g., a histogram) for the users of the enterprise may be produced. The distribution of these expected launch durations may be used as a descriptor for the enterprise environment.

The distribution of expected launch time durations may serve two purposes. The distribution may describe the launch duration times that the users of the enterprise are expected to have, considering the environment of the customer. Second, the distribution may be a descriptor for the environment of the enterprise, in terms of launch duration relevant resource availability that the enterprise provides and the type of application that the users may use. The produced distribution may be computed over time for each individual enterprise using a rolling time window. In this manner, changes in the enterprise environment may be captured.

At the inference phase, the produced distribution of expected launch duration times for each individual enterprise may be used to perform various assessments. For example, an outlier detection threshold may be calculated with respect to the computed distribution to act as the baseline for the launch time duration for the enterprise. The launch time duration may correspond to an amount of time to complete initialization of the application. An alert may be generated when the user experiences a launch time duration that is greater than the threshold. For this use, the whole distribution of launch duration times may be learned, given the feature vector of each launch event, instead of an expected value. Furthermore, the distribution characterizing the environment of the enterprise may be constructed using a number of samples from the learned distribution of each launch event of the enterprise.

Additionally, the produced distribution may be used to identify enterprises with similar environments through histogram similarity methods. This can have a number of applications. For example, the distributions of the observed launch durations of similar environments may be combined together. Outlier detection thresholds can be applied on the resulting combined histogram as a way to produce environment specific, launch duration baselines. An administrator of an enterprise in a certain segment can determine whether its environment is similar to the environments of other peer enterprises. In case the observed launch durations of the enterprise are larger than the ones of its peer enterprises, the administrator of the enterprise may identify whether this is due to differences in the environment describing factors (e.g., resource availability or type of applications) or due to other factors (e.g., different settings). The administrator of an enterprise may check whether the observed launch duration times of its users are aligned with other enterprises with similar environments.

In this manner, the model may be used to identify anomalous behavior from individual clients or enterprises and to diagnose performance-related issues with environments with enterprises in accessing remote network environments. With the information provided by the model, the allocation of computing and network resources may be configured to maintain or improve the performance of the enterprise in accessing the remote network environments. a At least one aspect of this disclosure is directed to systems, methods, and computer readable media for generating environment descriptors. A device having at least one process may identify a plurality of feature vectors. Each vector may describe a corresponding access to an application hosted on a server in one of a plurality of network environments and having a corresponding performance metric. The device may provide a performance model using the plurality of feature vectors and the corresponding performance metrics. The performance model may be used to determine expected performance metrics for at least a first network environment. A first environment descriptor of the expected performance metrics may be generated for at least the first network environment. The first environment descriptor of the expected performance metrics may be used to assess a measured performance metric or a second environment descriptor of a second network environment.

In some embodiments, the first environment descriptor of the expected performance metrics may be used to generate a threshold metric for identifying an outlier for at least the first network environment. In some embodiments, an alert may be generated responsive to the measured performance metric exceeding a threshold metric generated using the first environment descriptor for at least the first network environment.

In some embodiments, the first environment descriptor may be generated by combining an environment descriptor for the first network environment with an environment descriptor for a third network environment. In some embodiments, the second network environment may be grouped or categorized with the first network environment responsive to the first environment descriptor and the second environment descriptor being within a similarity threshold.

In some embodiments, a similarity metric between the first environment descriptor and the second environment descriptor may be determined. In some embodiments, the plurality of feature vectors may be identified using accesses to the application occurring within a time window.

In some embodiments, the performance model may be provided by correlating the plurality of feature vectors identified from across the plurality of network environments, with the corresponding performance metrics. In some embodiments, a distribution of the expected performance metrics may be generated for at least the first network environment using the expected performance metrics for at least the first network environment.

In some embodiments, each of the plurality of feature vectors may include an application identifier referencing the application and at least one of a processor utilization, memory usage, or a network round trip time, describing the corresponding access. In some embodiments, the corresponding performance metric may include at least one of a launch time duration, an application response time, or a frequency of transactions in the corresponding access.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 4C is a sequence diagram of a descriptor use phase in a system for generating environment descriptors for network environments;

FIG. 4D is a sequence diagram of a descriptor comparison phase in a system for generating environment descriptors for network environments.

Figure 1A:
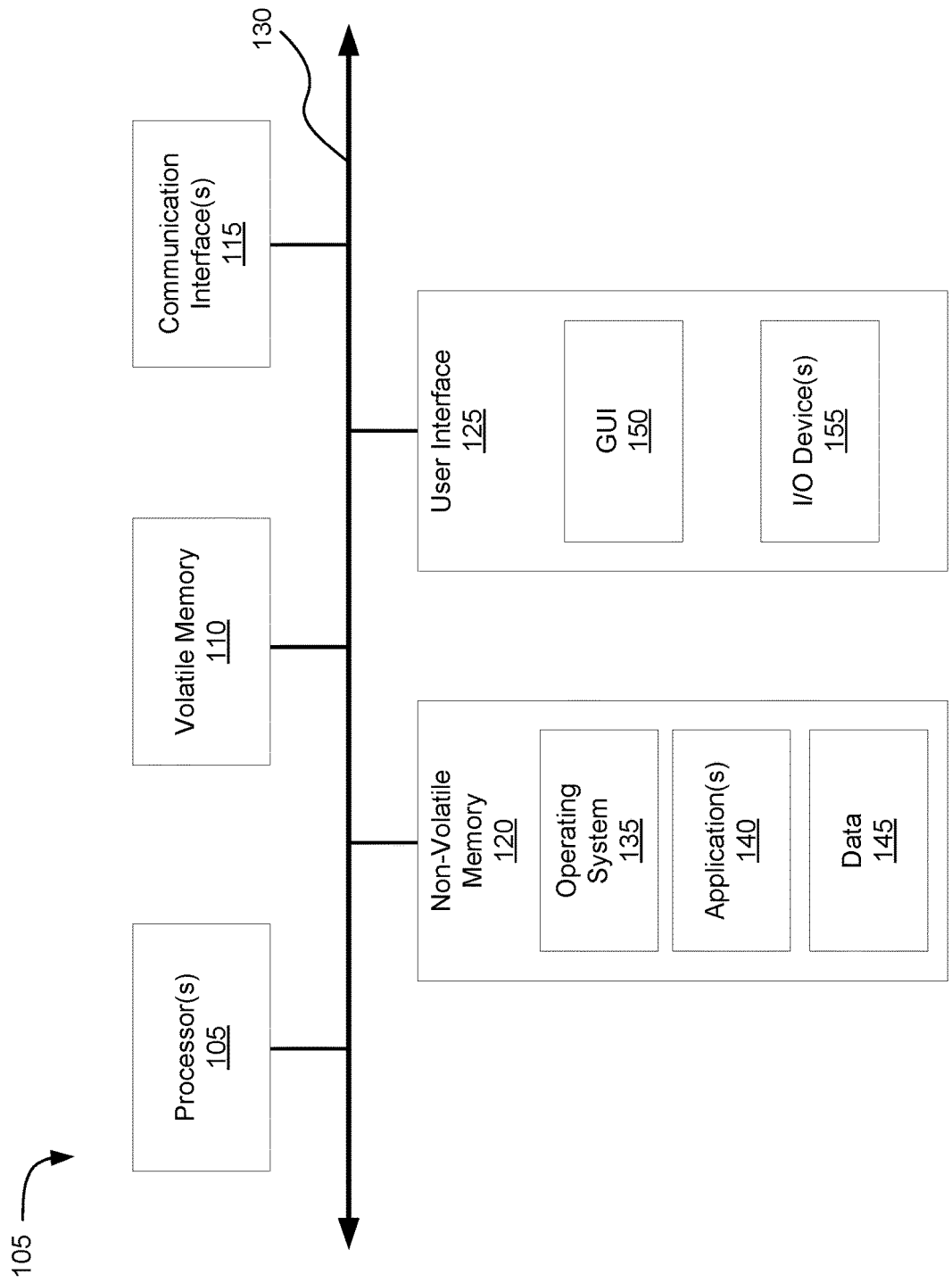
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods of generating environment descriptors for network environments.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 130 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 135, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 130 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 135 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
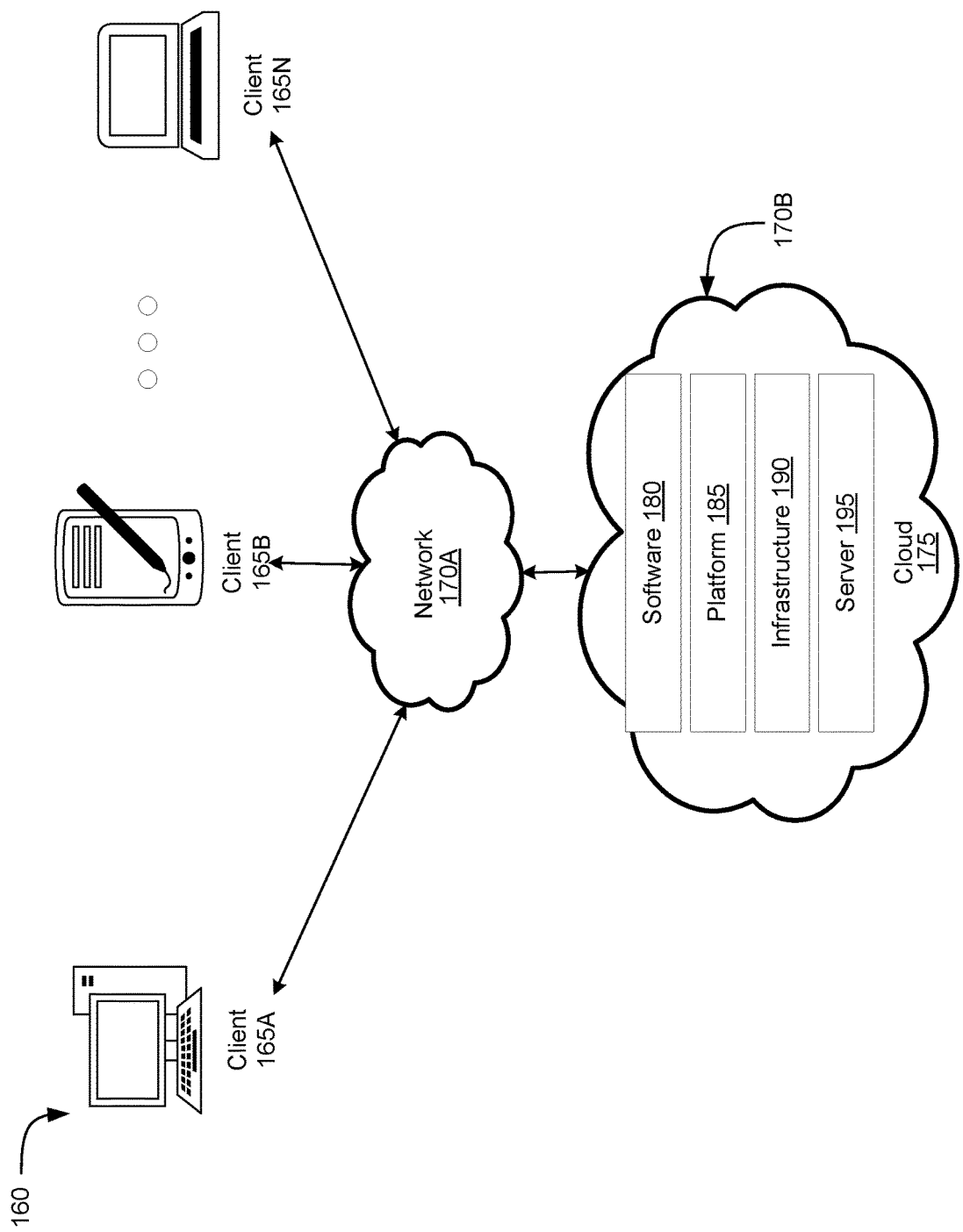
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
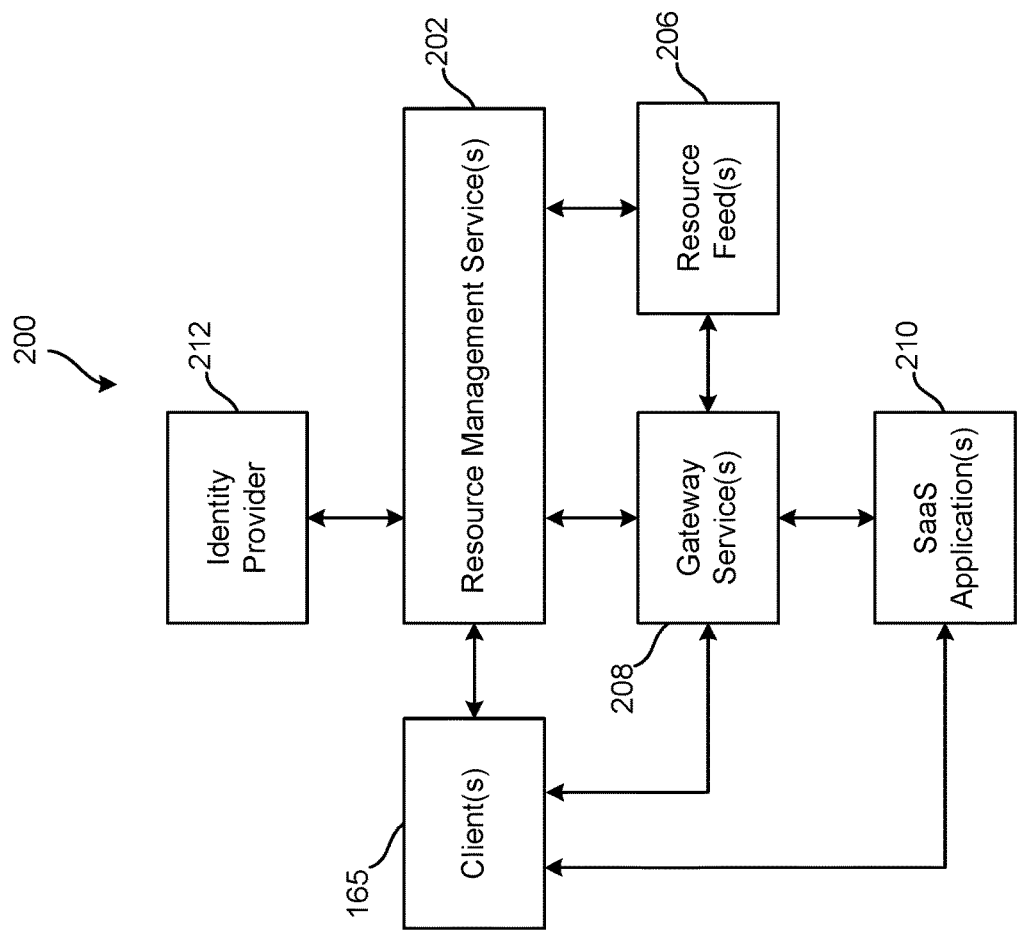
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
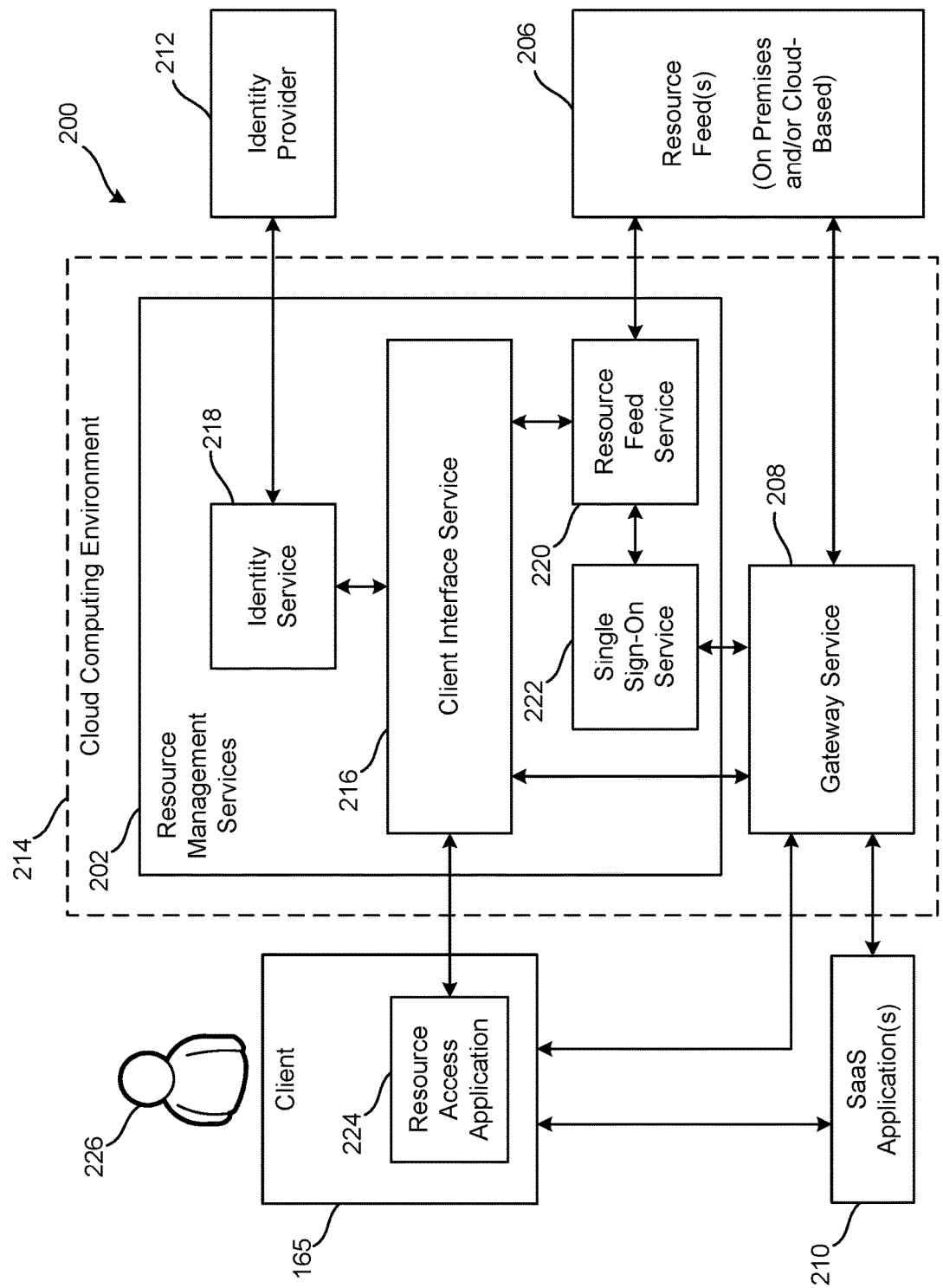
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by restricting the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
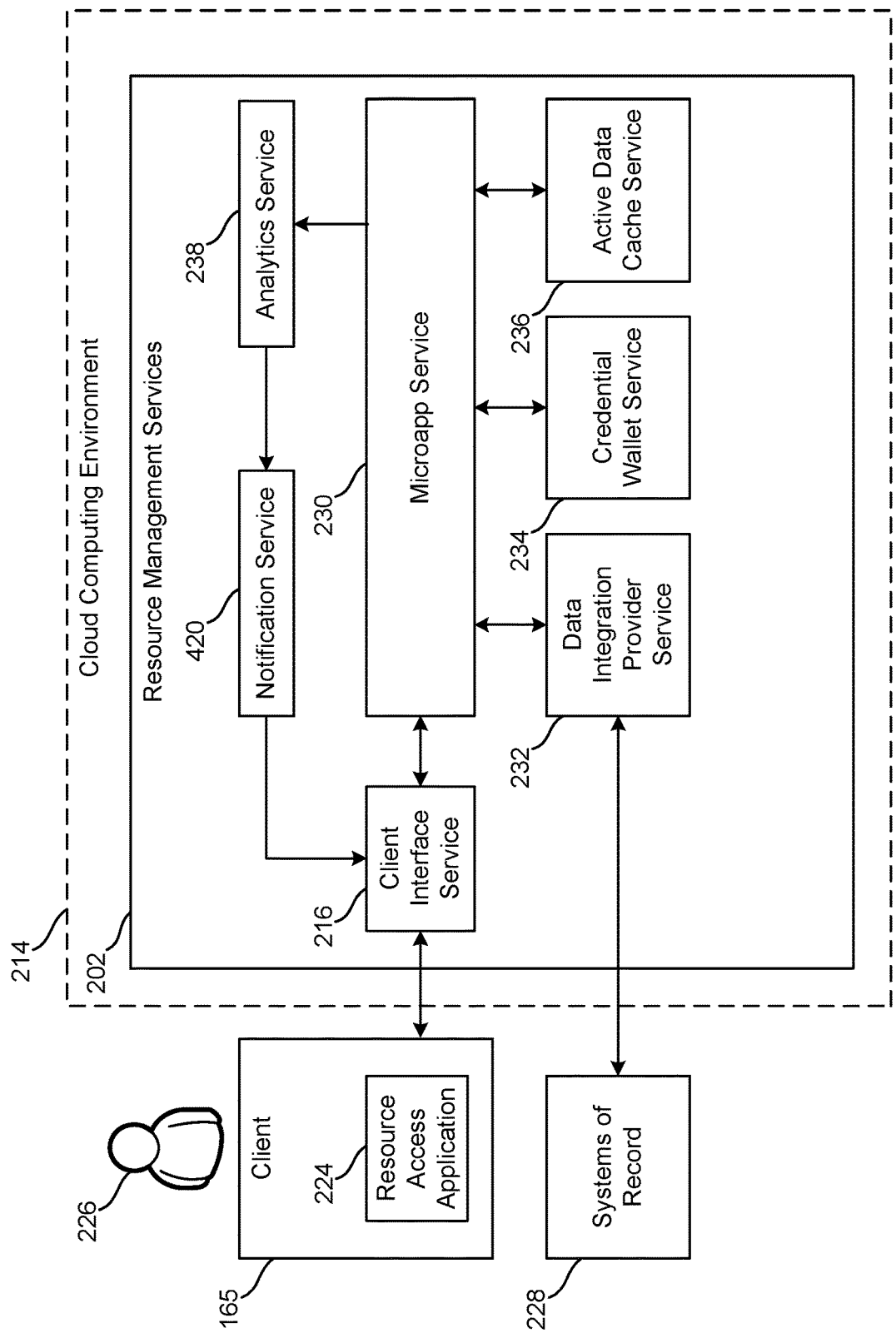
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted Oauth2 token for the system of record for which the action is to be invoked, and may send the action to the data integration provider service 232 together with the encrypted Oath2 token. The data integration provider service 232 may then decrypt the Oath2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance through either the resource access application 224 or directly from another resource, such as Microsoft Teams. This feature may allow employees to work efficiently, stay organized, and deliver only the specific information they are looking for.

Figure 3:
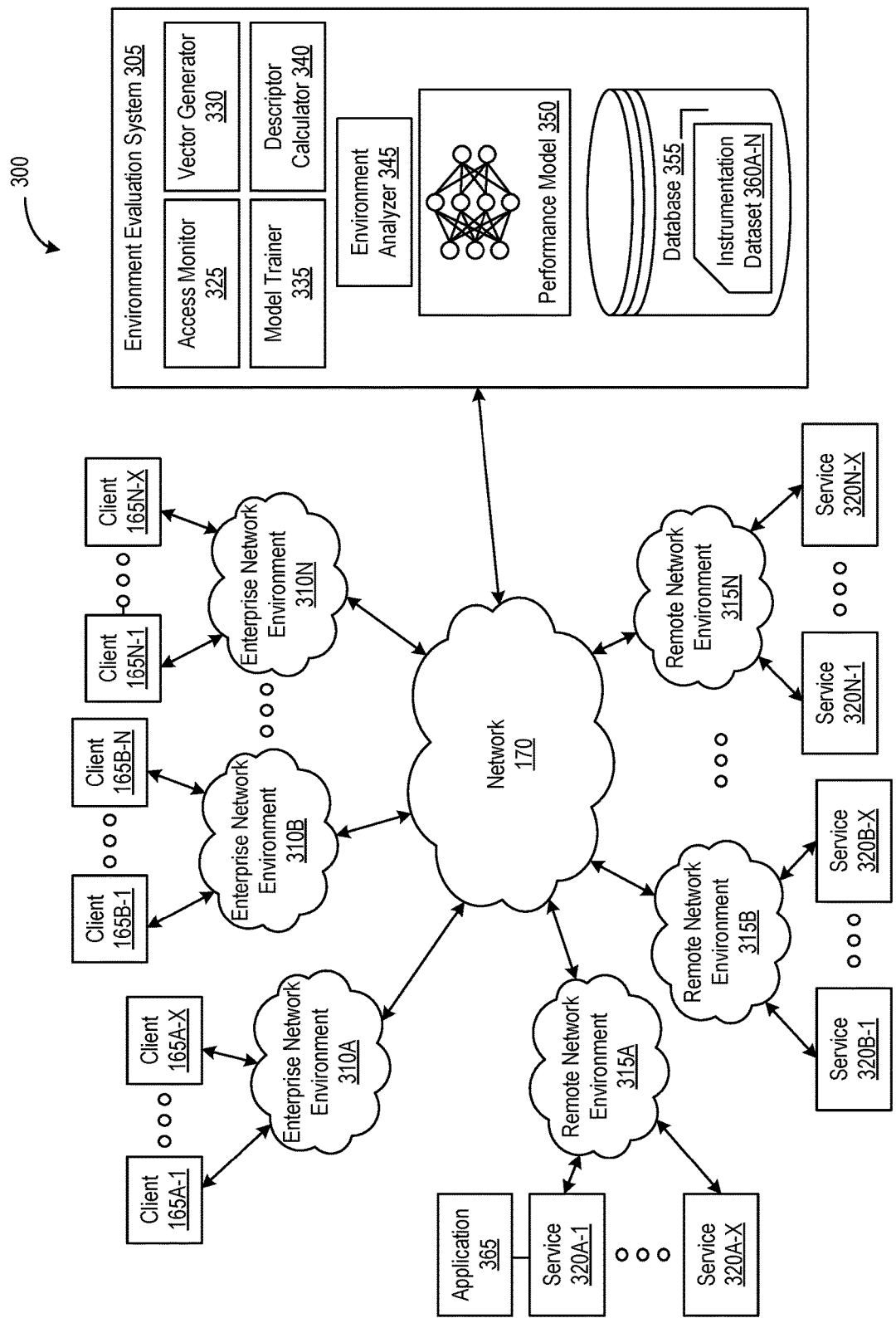
FIG. 3 is a block diagram of an embodiment of a system for generating environment descriptors for network environments.

C. Systems and Methods of Generating Environment Descriptors for Network Environments Referring now to FIG. 3, depicted is a block diagram of an embodiment of a system 300 for generating environment descriptors for network environments. In overview, the system 300 may include at least one environment evaluation system 305 (also generally referred herein as a server), a set of enterprise network environments 310A-N (hereinafter generally referred to as enterprise network environment 310), and a set of remote network environments 315A-N (hereinafter generally referred to as remote network environments 315), communicatively coupled via at least one network 170. Each enterprise network environment 310 (also referred herein as a customer network or customer) may handle, support, or otherwise include one or more clients 165A-1 to 165N-X (hereinafter generally referred to as client 165). Each remote network environment 315 (also referred herein as a workspace environment) may handle, support, or otherwise include one or more services 320A-1 to 320N-X (hereinafter generally referred to as service 320). The environment evaluation system 305 may include at least one access monitor 325, at least one vector generator 330, at least one model trainer 335, at least one descriptor calculator 340, at least one environment analyzer 345, at least one performance model 350, and at least one database 355. The database 355 may store, maintain, or otherwise include at least one instrumentation dataset 360A-N (hereinafter generally referred to as instrumentation dataset 360). The system may include at least one application 365 hosted at one of the services 320 in one of the remote network environments 315. In some embodiments, the functionalities of the environment evaluation system 305 may be distributed or shared among other components in the system 300. For example, the operations of the access monitor 325, the descriptor calculator 340, and the environment analyzer 345 may be performed at the service 320 or another computing device of the remote network environment 315.

Each of the above-mentioned elements or entities is implemented in hardware, or a combination of hardware and software, in one or more embodiments. Each component of the system 300 may be implemented using hardware or a combination of hardware or software detailed above in connection with FIG. 1. For instance, each of these elements or entities can include any application, program, library, script, task, service, process or any type and form of executable instructions executing on hardware of the system 300, such as the environment evaluation system 305 (including the access monitor 325, the vector generator 330, the model trainer 335, the descriptor calculator 340, the environment analyzer 345, the performance model 350, and the database 355), the enterprise network environments 310, the remote network environments 315, clients 165, and the services 320, among others. The hardware includes circuitry such as one or more processors in one or more embodiments.

The environment evaluation system 305 (including the access monitor 325, the vector generator 330, the model trainer 335, the descriptor calculator 340, the environment analyzer 345, the performance model 350, and/or the database 355) and the services 320 may be implemented using any of the components in connection with FIGS. 2A-C. In some embodiments, the environment evaluation system 305 may include, correspond to, or be part of a resource management service 202, the gate service 208, or the identity provider 212 (e.g., discussed in connection with at least FIGS. 2A and 2B), or any combination thereof, among others. In some embodiments, the service 320 may include, correspond to, or be part of the resource feed 206 or the SaaS service 210 (e.g., discussed in connection with at least FIGS. 2A and 2B), or any combination thereof, among others.

In further detail, to access the application 365 hosted at one of the services 320, the client 165 in one enterprise network environment 310 may communicate with the service 320 in the corresponding remote network environment 315. The application 365 may be a remote application hosted on the service 320 at one of the remote network environments 315, and may be accessible to the client 165 in the enterprise network environment 310. The communication in accessing the functionalities of the application 365 may be in accordance with a protocol, such as an application delivery protocol or a remote desktop protocol, among others. For instance, the client 165A-1 in the first enterprise network environment 310A may establish a communication session in accordance with the protocol with the first remote network environment 315A to access the service 320 hosting the application 365. In some embodiments, another application running on the client 165 may be used to access the application 365 hosted on the service 320 at the remote network environment 315. For example, a web browser executing on the client 165 may be used to access an instance of the application 365 hosted on the service 320 in one of the remote network environments 315. In some embodiments, the application 365 may be installed or executed from the client 165, and the resources of the service 320 in the remote network environment 315 may be accessed by the application 365 to perform one or more functions.

The access monitor 325 executing on the environment evaluation system 305 may monitor or identify one or more access events (sometimes referred herein as an access) between the client 165 in one enterprise network environment 310 in accessing the application 365 hosted on the service 320 of the remote network environment 315. Each access event may correspond to one or more operations performed in connection with the accessing of the application 365. Examples of access events may include a launch event (e.g., initialization), an authentication event (e.g., login), a communication establishment (e.g., establishing session for the application 365), a session operation (e.g., communicating with the application 365 in the same session), a data transfer operation (e.g., cut, copy, paste, or move), an access event (e.g., read, edit, or delete data), a termination event (e.g., closing), or any other event for performing one or more operations (e.g., loading a webpage, creating a calendar invite, or printing), among others. In some embodiments, the access monitor 325 may monitor for function calls (e.g., via an application programming interface or an event handler) invoked at the client 165 or the service 320 in accessing the application 365. In some embodiments, the access monitor 325 may monitor for data (e.g., data packets) communicated between the client 165 and the service 320 (or the enterprise network environment 310 and the remote network environment 315). Using the identification of the function calls or exchange of data, the access monitor 325 may detect the occurrence of an access event between the client 165 and the service 320 in connection with the accessing of the application 365. The detection of a set of function calls or exchange data may be identified as an access event. For example, the launch event may correspond to a particular sequence of function calls or data packets for accessing the application 365 at the client 165 or the service 320.

For each detected access event in connection to the accessing of the application 365, the access monitor 325 may measure, determine, or identify one or more measured metrics and performance factors. The measured metrics may describe the performance of the events corresponding to the one or more operations in connection with the accessing of the application 365. The performance factors may describe characteristics contributing to the measured metrics. The measured metrics may include, for example, a time to completion of the event at the client 165 or the service 320, a response time to the event at the client 165 or the service 320, a session responsiveness of the application 365, a frequency of the events at the client 165, an success rate or an error rate for the event at the client 165 or the service 320, and a probability of success or failure in performing the access event, among others. The performance factors may include, for example, a processor utilization at the client 165 or the service 320, memory utilization at the client 165 or the service 320, power consumption at the client 165 or the service 320, network bandwidth usage between the client 165 and the service 320, network round trip time between the client 165 and the service 320, network bandwidth available between the clients 165 and the service 320, and number of concurrent active sessions between clients 165 with the service 320, among others. The measured metrics may be determined using one or more combinations of the performance factors. For example, the session responsiveness for the application 365 may be determined using a median of network round trip times during the session. The session responsiveness may also be based on a ratio of the network bandwidth per number of concurrent active sessions.

These performance factors may be measured by the access monitor 325 using various monitoring techniques. In some embodiments, the access monitor 325 may retrieve or identify at least some of the performance factors of the access event from the client 165 or the service 320. For example, the access monitor 325 may request the performance factors from an instrumentation service operated by the service 320. The performance factors may differ among the client 165 within a single enterprise network environment 310 and may vary among different enterprise network environments 310. Conversely, the performance factors may be similar (e.g., with a relatively low variance) among the client 165 within a single enterprise network environment 310, and may be similar between at least two of the enterprise network environments 310.

Using the performance factors identified for the access events, the access monitor 325 may maintain the instrumentation dataset 360 on the database 355. Each instrumentation dataset 360 may be maintained for a particular enterprise network environment 310. In some embodiments, each instrumentation dataset 360 may be arranged for a particular client 165, remote network environment 315, service 320, or application 365. For each access event, the access monitor 325 may generate one or more identifiers, such as: an event identifier for the access event, an application identifier referencing the application 365, a client identifier referencing the client 165, a customer identifier referencing the enterprise network environment 310 to which the client 165 belongs to, a service identifier referencing the service 320 hosting the application 365, and a remote network identifier referencing the remote network environment 315 to which the service 320 belongs to, among others. In some embodiments, the access monitor 325 may generate or identify a timestamp identifying the occurrence of the access event. For each access event, the access monitor 325 may generate an entry to include the one or more identifiers, the measured metrics, the performance factors, and the timestamp to include into the instrumentation dataset 360. Each entry may define or describe the corresponding detected access event. With the generation, the access monitor 325 may include the entry into the instrumentation dataset 360. In some embodiments, the access monitor 325 may update the instrumentation dataset 360 on the database 355.

Figure 4A:
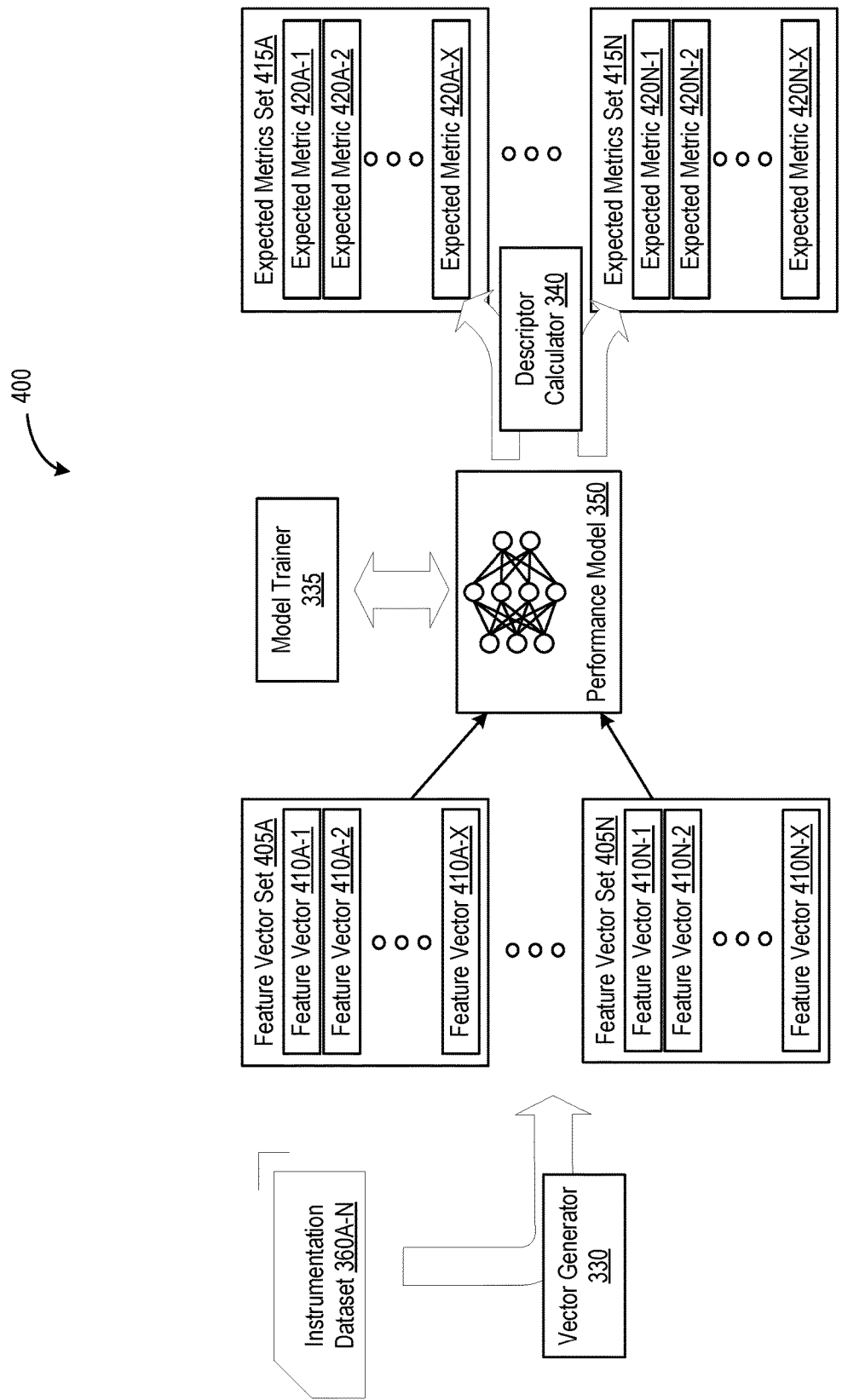
FIG. 4A is a sequence diagram of a model training phase in a system for generating environment descriptors for network environments.

Referring now to FIG. 4A, depicted is a sequence diagram of a model training phase 400 in the system 300 for generating environment descriptors for network environments. Under the model training phase 400, the vector generator 330 executing on the environment evaluation system 305 may access the database 355 to retrieve or identify each instrumentation dataset 360 maintained for the enterprise network environment 310. With the identification, the vector generator 330 may extract or identify one or more entries from the instrumentation dataset 360 describing the access events. In some embodiments, the vector generator 330 may select or identify a subset of entries from the instrumentation dataset 360 based on a time window. The time window may be relative to the present time. For example, the time window may extend 6 hours to 1 week from the present. The identified subset of entries extracted from the instrumentation dataset 360 may have time stamps falling within the designated time window. In some embodiments, the vector generator 330 may identify the entries from the instrumentation dataset 360 by individual enterprise network environments 310. Each identified entry may correspond to access events occurring between the clients 165 of one enterprise network environment 310 and the service 320 in one remote network environment 315 in accessing the application 365.

With the identification of the entries from the instrumentation dataset 360, the vector generator 330 may generate or identify a feature vector set 405A-N (hereinafter generally referred to as vector set 405) for the enterprise network environment 310. Each feature vector set 405 may describe the performance metrics of the corresponding enterprise network environment 310 in accessing the application 365 hosted on the service 320 in the remote network environment 315. The feature vector set 405 may include one or more feature vectors 410A-1 to 410N-X (hereinafter generally referred to as a feature vector 410). Each feature vector 410 may describe or correspond to an access event in accessing the application 365 from one of the client 165 in the enterprise network environment 310. Each feature vector 410 may identify or include one or more measured metrics from the entries of the instrumentation dataset 360 as discussed above, such as the time to complete for a launch event. Each feature vector 410 may identify or include one or more performance factors from the instrumentation dataset 360 as discussed above, such as processor utilization, memory consumption, and network round trip time. In some embodiments, each feature vector 410 may also identify or include at least one identifier as discussed above, such as the application identifier referencing the application 365. With the generation, the vector generator 330 may add or include the feature vector 410 into the feature vector set 405 for the enterprise network environment 310. The vector generator 330 may repeat the process of generating and identification of feature vectors 410 and feature vector sets 405 across multiple enterprise network environments 310.

The model trainer 335 executing on the environment evaluation system 305 may train, establish, or otherwise provide the performance model 350 using the feature vector sets 405 across different enterprise network environments 310. The performance model 350 may correlate the performance factors (e.g., processor utilization, memory consumption, and network round trip time) with measured metrics (e.g., the launch time duration login time duration, error rate, or probability of failure) for the application 365 accessed by clients 165 from one or more enterprise network environments 310. The performance model 350 may include, correspond to, or be a statistical model (e.g., a linear or logistic regression model), a stochastic model (e.g., a Poisson process, a Markov process, or a Gaussian process), or a machine learning model (e.g., an artificial neural network (ANN), a support vector machine (SVM), a decision tree, a random forest, and a k means clustering model), among others. In general, the performance model 350 may include a set of inputs, a set of outputs, and a set of parameters relating the inputs to the outputs. The inputs of the performance model 350 may include the performance factors and the one or more identifiers. The outputs of the performance model 350 may include predicted or expected performance metrics (e.g., launch time duration and login time duration) based on the output. The parameters of the performance model 350 may be set to initial values (e.g., random) prior to training.

In training the performance model 350, the model trainer 335 may feed the performance factors from each feature vector 410 of the feature vector sets 405 into the input of the performance model 350. The feature vector sets 405 may be for different enterprise network environments 310. In some embodiments, the model trainer 335 may feed the identifiers from the feature vector sets 405 into the input of the performance model 350. In some embodiments, the model trainer 335 may also feed the measured performance metrics from the feature vector sets 405 into the input of the performance model 350. Upon feeding, the model trainer 335 may apply the set of parameters of the performance model 350 to the inputs from the feature vector 410 to generate the outputs. The outputs may correspond to the expected performance metrics (e.g., launch time duration) based on the input. The model trainer 335 may compare the outputs to the measured metrics of the feature vector 410 used for the input. Based on the comparison, the model trainer 335 may calculate or determine a loss metric, such as a root-mean-square error (RMSE), mean squared error (MSE), and mean absolute area (MAE), among others. The loss metric may indicate the deviation between the measured metric from the feature vector 410 and the predicted metric from the performance model 350.

Using the loss metric, the model trainer 335 may update the parameters of the performance model 350. The model trainer 335 may repeat the process of updating the parameters of the performance model 350 until convergence. For example, the model trainer 335 may determine or assess whether the change in values of the parameters in the performance model 350 from one iteration to the next is less than a convergence threshold. When the change in values is determined to be below the threshold, the model trainer 335 may determine that the performance model 350 has yet to converge and may continue to train the performance model 350 using the feature vectors 410 of the feature vectors sets 405. Otherwise, when the change in values is determined to be greater than the threshold, the model trainer 335 may determine that the performance model 350 has converged and may halt training. In training the performance model 350, the model trainer 335 may correlate the performance factors to the measured metrics via the performance model 350. In some embodiments, the model trainer 335 may store and maintain the performance model 350 on a database accessible to the environment evaluation system 305. In some embodiments, the model trainer 335 may update the performance model 350 using new entries from the instrumentation dataset 360, and may repeat the above described functionalities.

With the establishment of the performance model 350, the descriptor calculator 340 executing on the environment evaluation system 305 may use the performance model 350 to calculate, determine, or generate at least one expected metrics set 415A-N (hereinafter generally referred to expected metrics sets 415) for each enterprise network environment 310. The expected metrics set 415 may describe the anticipated performance for clients 165 in the associated enterprise network environment 310 accessing the service 320 of the remote network environment 315. The expected metrics set 415 may include a set of expected metrics 420A-1 to 420N-X (hereinafter generally referred to expected metrics 420). The expected metrics 420 may define, identify, or correspond to anticipated time to completion of the access event at the client 165 or the service 320, an anticipated response time to the access event at the client 165 or the service 320, and an anticipated frequency of the access events at the client 165, among others.

To generate the expected metrics 420 for the expected metrics set 415, the descriptor calculator 340 may apply the performance model 350 to sample performance factors for the clients 165 of the enterprise network environment 310 in accessing the application 365. In some embodiments, the descriptor calculator 340 may apply the performance model 350 to one or more identifiers, such as identifier for the enterprise network environment 310, the identifiers for the application 365, and the identifiers for the client 165, among others. The descriptor calculator 340 may generate the sample performance factors from the feature vectors 410 of the feature vector set 405 for the enterprise network environment 310. In some embodiments, the sample performance factors may be generated by the descriptor calculator 340 using an estimation technique, such as interior reconstruction or extrapolation, among others. In some embodiments, the sample performance factors may be generated using a simulation, such as a Monte Carlo simulation, among others. In applying the performance model 350, the descriptor calculator 340 may feed each sample performance factor into the inputs of the performance model 350 and process using the parameters of the performance model 350. The descriptor calculator 340 may identify the expected metric 420 corresponding to the sample performance factor from the output of the performance model 350. The descriptor calculator 340 may add the expected metric 420 to the expected metrics set 415 for the enterprise network environment 310. The descriptor calculator 340 may repeat the process of generating expected metrics 420 for the expected metric sets 415 for differing enterprise network environments 310.

Figure 4B:
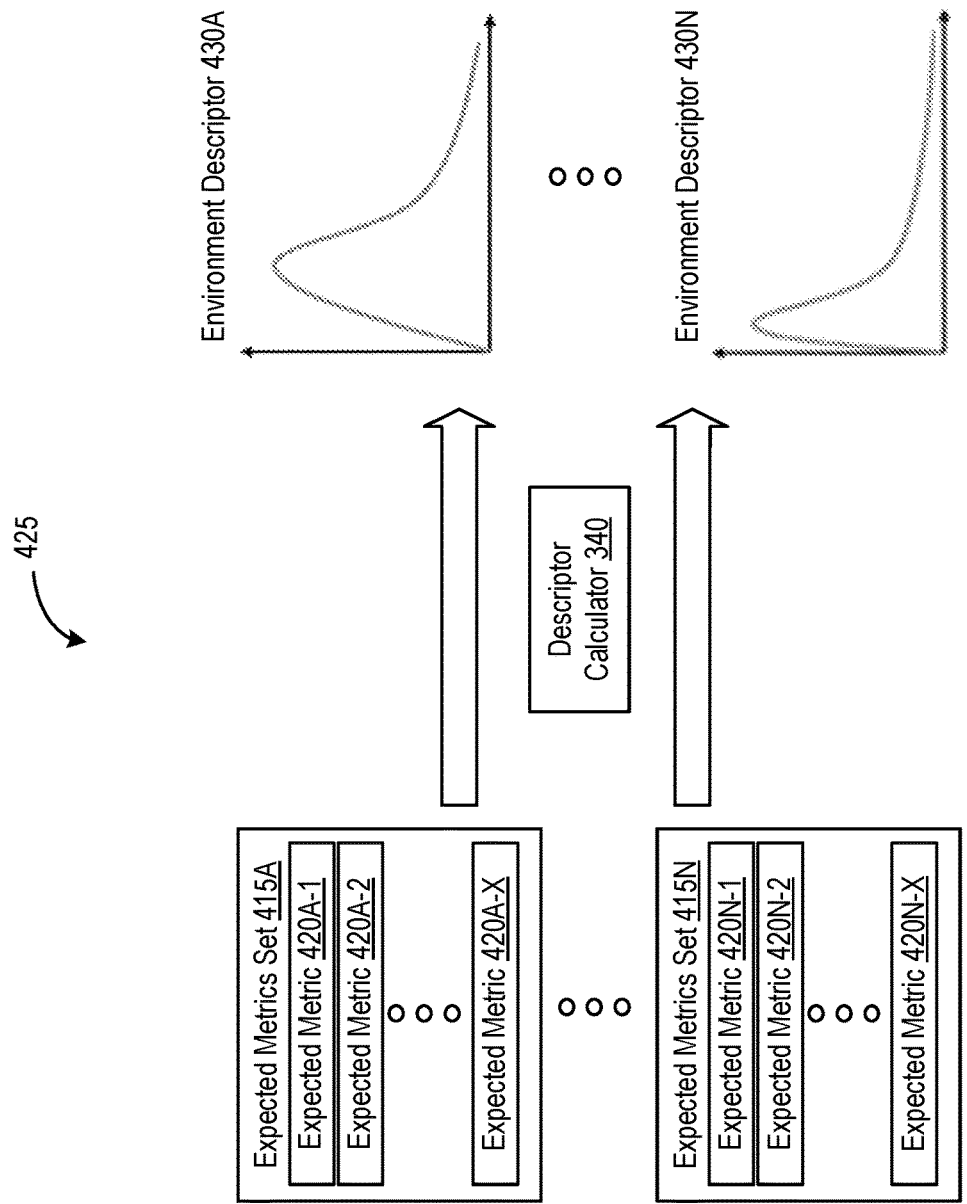
FIG. 4B is a sequence diagram of a descriptor generation phase in a system for generating environment descriptors for network environments.

Referring now to FIG. 4B, depicted is a sequence diagram of a descriptor generation phase 425 in the system 300 for generating environment descriptors for network environments. In some embodiments, the descriptor generation phase 425 may be performed in conjunction with the model training phase 400. Under the descriptor generation phase 425, the descriptor calculator 340 may use the expected metric sets 415 to determine or generate corresponding environment descriptors 430A-N (hereinafter generally referred to environment descriptors 430). The environment descriptor 430 may define or indicate anticipated performance metrics for the clients 165 of the enterprise network environment 310 in accessing the application 365 hosted on the service 320 via the remote network environment 315. The performance metrics indicated by the environment descriptor 430 may include time to completion of the access event at the client 165 or the service 320, an anticipated response time to the access event at the client 165 or the service 320, and an anticipated frequency of the access events at the client 165, among others as discussed above.

In generating the environment descriptor 430, the descriptor calculator 340 may identify or determine a distribution of the expected metrics 420 of the expected metrics set 415 for the enterprise network environment 310. The distribution may be, for example, a frequency distribution (e.g., a histogram as depicted), a cumulative distribution, or a probability distribution (e.g., a probability mass function, a probability density function, and character function), among others. For instance, to generate a frequency distribution, the descriptor calculator 340 may identify values for the expected metrics 420 of the expected metrics set 415 for the enterprise network environment 310. For each value (or buckets of values), the descriptor calculator 340 may count the number or frequency of expected metrics 420 with the same value. Based on the values and the frequencies of the values for the expected metrics 420 of the expected metrics set 415, the descriptor calculator 340 may determine the distribution of the expected metrics 420. The descriptor calculator 340 may use the distribution as the environment descriptor 430. In some embodiments, the descriptor calculator 340 may store and maintain the environment descriptor 430 on a database accessible to the environment evaluation system 305. In some embodiments, the descriptor calculator 340 may provide or transmit the environment descriptor 430 to the service 320 hosting the application 365 or the remote network environment 315 to which the service 320 belongs. The environment descriptor 430 may be used to evaluate or assess newly measured performance metrics from the same enterprise network environment 310 or another enterprise network environment 310.

Referring now to FIG. 4C, depicted is a sequence diagram of a descriptor use phase 435 in the system 300 for generating environment descriptors for network environments. The descriptor use phase 435 may be a part of an inference phase in relation to the performance model 350. Under the threshold identification phase 435, the environment analyzer 345 executing on the environment evaluation system 305 may calculate, determine, or otherwise generate at least one threshold metric 440 for the enterprise network environment 310. The threshold metric 440 may be generated using the environment descriptor 340 for the enterprise network environment 310. The threshold metric 440 may delineate or define a value for a measured metric at which the corresponding access event is classified as an outlier, an anomaly or otherwise to trigger an action. The measured metric may be identified from an access event by a client 165 of the enterprise network environment 310 in accessing the application 365.

To determine the threshold metric 440, the environment analyzer 345 may calculate or determine one or more summary statistics of the environment descriptor 430. The summary statistics may include, for example, an average, a mode, a variance, a standard deviation, a mean absolute difference, a coefficient of variation, or a moment, among others. Based on the summary statistic, the environment analyzer 345 may calculate or determine the threshold metric 440. For example as depicted, the environment analyzer 345 may determine a mode (X) and a standard deviation (a) for the distribution of metrics in the environment descriptor 430. In this example, the environment analyzer 345 may use a multiple of the standard deviation (e.g., $3a$) from the mode as the threshold metric 440 for the enterprise network environment 310. With the determination of the summary statistics, the environment analyzer 345 may store and maintain the threshold metric 440 on a database accessible to the environment evaluation system 305. In some embodiments, the environment analyzer 345 may provide or transmit the threshold metric 440 to the enterprise network environment 310 associated with the environment descriptor 430. In some embodiments, the environment analyzer 345 may provide or transmit the threshold metric 440 to the remote network environment 315 to which the application 365 belongs.

The threshold metric 440 may be used to trigger an action to be performed at the enterprise network environment 310 to which the client 165 belongs or the remote network environment 315 to which the service 320 hosting the application 365 belongs. The action may include, for instance: generation of an alert regarding the access event, termination of the access event, restriction of the communication session over which the access event is exchanged, among others. For example, the access monitor 325 may detect a new access event by one of the clients 165 in the enterprise network environment 310 in accessing the application 365 hosted on the service 320. Upon detection, the access monitor 325 may identify or measure the metric for the access event, such as the time to completion of the launch event. The environment analyzer 345 may compare the measured metric for the detected access event against the threshold metric 440 determined from the environment descriptor 430 for the enterprise network environment 310. When the measured metric is determined to be less than the threshold metric 440, the environment analyzer 345 may determine that the access event is not anomalous. On the other hand, when the measured metric is determined to be greater than or equal to the threshold metric 440, the environment analyzer 345 may determine that the access event is anomalous. In some embodiments, the environment analyzer 345 may perform the action in response to exceeding the threshold metric 440. For example, the environment analyzer 345 may cause an alert to be generated and presented to an administrator of the enterprise network environment 310. The above described functionalities of the access monitor 325 and the environment analyzer 345 may be performed by the enterprise network environment 310 or the remote network environment 315.

Referring now to FIG. 4D, depicted is a sequence diagram of a descriptor comparison phase 450 for comparing environment descriptors of network environments. Under the descriptor comparison phase 450, the environment analyzer 345 may use the first environment descriptor 430A for a first enterprise network environment 310A to evaluate or assess the second environment descriptor 430B for a second enterprise network environment 310B. The first environment descriptor 430A may define or describe the distribution of the expected metrics 420 for the clients 165 in the first enterprise network environment 310A. The second environment descriptor 430B may define or describe the distribution of the expected metrics 420 for the clients 165 in the second enterprise network environment 310B. The first enterprise network environment 310A and the second enterprise network environment 310B may be configured differently and may be from different segments. For example, the first enterprise network environment 310A may be an Intranet at a branch office, while the second network environment 310B may be a local area network at a direct end user. As a result, the clients 165 may experience different metrics in accessing the application 365 hosted on the service 320 at the remote network environment 315. Any number of environment descriptors 430 may be used in the assessment.

To perform the assessment, the environment analyzer 345 may compare the first environment descriptor 430A and the second environment descriptor 430B to generate or determine at least one distance measure 455 (sometimes referred herein as a similarity metric). The distance measure 455 may identify or measure a similarity or a difference between the distribution of expected metrics 420 in the first environment descriptor 430A and the distribution of expected metrics 420 in the second environment descriptor 430B. In some embodiments, the environment analyzer 345 may perform a statistical analysis between the first environment descriptor 430A and the second environment descriptor 430B to determine the distance measure 455. The statistical analysis may include a statistical hypothesis test, such as a chi-squared test and a Kolmogorov-Smirnov test, among others. In some embodiments, the environment analyzer 345 may determine the distance measure 455 using a similarity function, such as a Bhattacharyya distance or a kernel function. In some embodiments, the environment analyzer 345 may use an entropy measure (e.g., relative entropy) as the distance measure 455. The environment analyzer 345 may compare any number of environment descriptors 430 in determining the distance measure 455.

Upon determination, the environment analyzer 345 may compare the distance measure 455 between the first environment descriptor 430A and the second environment descriptor 430B to a similarity threshold. The similarity threshold may define or delineate a value for the distance measure 455 at which the first environment descriptor 430A and the second environment descriptor 430B are to be determined as similar or dissimilar. When the distance measure 455 is determined to not satisfy (e.g., greater than) the similarity threshold, the environment analyzer 345 may determine that the first environment descriptor 430A and the second environment descriptor 430B are dissimilar. In addition, the environment analyzer 345 may determine that the first enterprise network environment 310A and the second enterprise network environment 310B are dissimilar. In some embodiments, the environment analyzer 345 may classify or category the first enterprise network environment 310A for the first environment descriptor 430A and the second enterprise network environments 310B for the second environment descriptor 430B into different groups. The categorization into different groups may indicate that the first enterprise network environment 310A and the second enterprise network environments 310B are dissimilar in performance in accessing the application 365 hosted on the service 320. The categorization into different groups may indicate that the enterprise network environments 310A and 310B are dissimilar in types of environments.

On the other hand, when the distance measure 455 is determined to satisfy (e.g., be less than or equal to) the similarity threshold, the environment analyzer 345 may determine that the first environment descriptor 430A and the second environment descriptor 430B are similar. In addition, the environment analyzer 345 may determine that the first enterprise network environment 310A and the second enterprise network environment 310B are similar. In some embodiments, the environment analyzer 345 may classify or category the first enterprise network environment 310A for the first environment descriptor 430A and the second enterprise network environments 310B for the second environment descriptor 430B into the same group. The categorization into the same group may indicate that the first enterprise network environment 310A and the second enterprise network environments 310B are similar in performance in accessing the application 365 hosted on the service 320. The categorization into the same group may also indicate that the enterprise network environments 310A and 310B are similar in the type of environment.

In some embodiments, the environment analyzer 345 may generate at least one combined environment descriptor 430' based on the first environment descriptor 430A and the second environment descriptor 430B when the distance measure 455 is determined to satisfy the similarity threshold. The environment analyzer 345 may invoke the descriptor calculator 340 to generate the combined environment descriptor 430' using the first environment descriptor 430A and the second environment descriptor 430B. The descriptor calculator 340 may generate the combined environment descriptor 430' as discussed above in connection with FIGS. 4A and 4B. For example, the descriptor calculator 340 may identify the expected metrics 420 in the expected metrics set 415 for the first enterprise network environment 310A and the expected metrics 420 in the expected metrics set 415 for the second enterprise network environment 310B. Using the expected metrics 420 from the two environment descriptors 430A and 430B, the descriptor calculator 340 may generate the combined environment descriptor 430'. In some embodiments, the combined environment descriptor 430' may be produced by combining observed (e.g., measured) performance metrics, coming from environments (e.g., the enterprise network environments 310A and 310B) which have been detected as similar with the use of the original environment descriptors (e.g., the environment descriptors 430A and 430B). For example, the combined environment descriptor may be produced by combining environment based histograms of observed performance metrics, coming from such similar environments. In addition, the descriptor calculator 340 may use the combined environment descriptor 430' to generate the threshold metric 440 for the two enterprise network environments 310A and 310B in the manner as discussed above in connection with FIG. 4C.

In this manner, the environment descriptors 430 and the performance model 350 may be used to assess and evaluate the enterprise network environments 310 in accessing the application 365 hosted on the service 320 of the remote network environment 315. For example, when categorized into the same group, the first enterprise network environment 310A and the second enterprise network environments 310B may be identified as having similar performance, configured in a similar manner, or belonging to similar environments. Conversely, when categorized into different groups, the first enterprise network environment 310A and the second enterprise network environments 310B may be identified as having different performance, configured in a differing manner, or belonging to dissimilar environments. Using the assessments, any potential configuration issues within the enterprise network environments 310 from accessing the application 365 hosted on the service 210 may be diagnosed and rectified.

Figure 5:
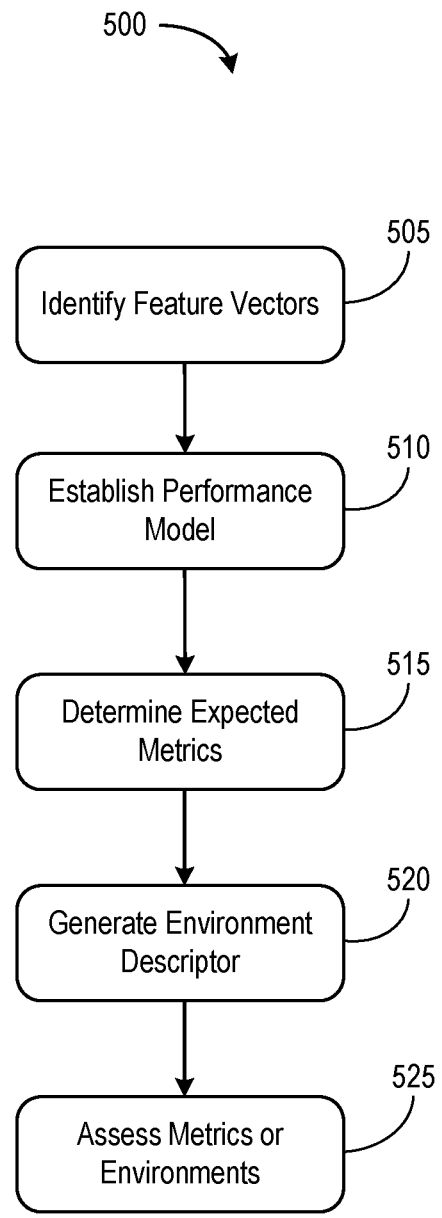
FIG. 5 is a flow diagram of an embodiment of a method of generating environment descriptors for network environments.

Referring now to FIG. 5, depicted is a flow diagram of an embodiment of a method 500 of generating environment descriptors for network environments. The method 500 may be implemented or performed using any of the components described above, such as the environment evaluation system 305 or the service 320. In brief overview, a computing system may identify feature vectors (505). The computing system may establish a performance model (510). The computing system may determine expected metrics (515). The computing system may generate an environment descriptor (520). The computing system may assess one or more metrics or environments (525).

In further detail, a computing system (e.g., the environment evaluation system 305) may identify feature vectors (e.g., the feature vectors 410) (505). The computing system may generate feature vectors from entries in a dataset (e.g., the instrumentation dataset 360) for one or more enterprise network environments (e.g., the enterprise network environment 310). Each feature vector may describe an access event by a client (e.g., the client 165) in an enterprise network environment in accessing an application hosted on a server (e.g., the service 320). Each feature vector may also identify a performance factor (e.g., processor utilization, memory consumption, and network round trip time) and an observed metric (e.g., a completion time for the access event) for the access event.

The computing system may establish a performance model (e.g., the performance model 350) (510). The computing system may use the feature vectors from different enterprise network environments to train and establish the performance model. The performance model may have a set of inputs, a set of outputs, and a set of parameters. The input of the performance model may include performance factors (e.g., processor utilization, memory consumption, and network round trip time) and the output of the performance model may include expected metrics (e.g., a completion time for the access event, such as launching or logging in). In training, the performance model may correlate the performance factors with the observed metrics via the parameters.

The computing system may determine expected metrics (e.g., the expected metrics 420) (515). The computing system may use the performance model to generate an expected metrics set (e.g., the expected metrics set 415) for each enterprise network environment. The computing system may perform an estimation technique or a simulation to generate sample performance factors for one of the enterprise network environments. The computing system may feed the sample performance factors into the performance model to determine the expected metrics set for each enterprise network environment.

The computing system may generate an environment descriptor (e.g., the environment descriptor 430) (520). The computing system may use the expected metrics set (e.g., expected launch times) to generate the environment descriptor. The environment descriptor may specify the expected performance metrics for clients of the enterprise network environment in accessing the application. The environment descriptor may be, for example, a distribution of the expected metrics for the enterprise network environment.

The computing system may assess one or more metrics or environments (525). The assessment may be performed using the environment descriptor. The computing system may compare the environment descriptors for different enterprise network environments to determine a distance measure (e.g., the distance measure 455). Based on the distance measure, the computing system may determine whether the corresponding enterprise network environment is similar or dissimilar. When the enterprise network environments are determined to be similar, the computing system may classify the enterprise network environments, and may generate a new combined environment descriptor (e.g., the combined environment descriptor 430).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of generating environment descriptors, comprising:
identifying, by a device having at least one processor, a plurality of feature vectors each identifying a corresponding performance metric corresponding to access by one or more clients via at least one of a plurality of network environments to an application hosted on a server;
providing, by the device, a performance model using the plurality of feature vectors and the corresponding performance metrics;
determining, using the performance model, first expected performance metrics corresponding to access of the application by at least one first client via at least a first network environment;
generating, based at least on the first expected performance metrics, a first environment descriptor for at least the first network environment to be used by the at least one first client to access the application; and
determining a similarity metric between the first environment descriptor of the first expected performance metrics and a second environment descriptor of second expected metrics for a second network environment to be used by at least one second client.

2. The method of claim 1, further comprising generating, using the first environment descriptor of the first expected performance metrics, a threshold metric for identifying an outlier for at least the first network environment.

3. The method of claim 1, further comprising generating an alert responsive to the measured performance metric exceeding a threshold metric generated using the first environment descriptor for at least the first network environment.

4. The method of claim 1, further comprising generating the first environment descriptor by combining an environment descriptor for the first network environment with an environment descriptor for a third network environment.

5. The method of claim 1, further comprising grouping or categorizing the second network environment with the first network environment responsive to the first environment descriptor and the second environment descriptor being within a similarity threshold.

6. The method of claim 1, comprising identifying the plurality of feature vectors using accesses to the application occurring within a time window.

7. The method of claim 1, comprising providing the performance model by correlating the plurality of feature vectors identified from across the plurality of network environments, with the corresponding performance metrics.

8. The method of claim 1, wherein generating the first environment descriptor comprises generating a distribution of the first expected performance metrics for at least the first network environment using the first expected performance metrics for at least the first network environment.

9. The method of claim 1, wherein each of the plurality of feature vectors includes an application identifier referencing the application and at least one of a processor utilization, memory usage, or a network round trip time, describing the corresponding access, and
wherein the corresponding performance metric includes at least one of a launch time duration, an application response time, or a frequency of transactions in the corresponding access.

10. A system for generating environment descriptors, comprising:
at least one processor configured to:
identify a plurality of feature vectors each identifying a corresponding performance metric corresponding to access by one or more clients via at least one of a plurality of network environments to an application hosted on a server;
provide a performance model using the plurality of feature vectors and the corresponding performance metrics;
determine, using the performance model, first expected performance metrics corresponding to access of the application via at least a first network environment;
generate, based at least on the first expected performance metrics, a first environment descriptor for at least the first network environment to be used by the at least one first client to access the application; and
determine a similarity metric between the first environment descriptor of the first expected performance metrics and a second environment descriptor of second expected performance metrics for a second network environment to be used by at least one second client.

11. The system of claim 10, wherein the at least one processor is further configured to generate, using the first environment descriptor of the first expected performance metrics, a threshold metric for identifying an outlier for at least the first network environment.

12. The system of claim 10, wherein the at least one processor is further configured to generate an alert responsive to the measured performance metric exceeding a threshold metric generated using the first environment descriptor for at least the first network environment.

13. The system of claim 10, wherein the at least one processor is further configured to generate the first environment descriptor by combining an environment descriptor for the first network environment with an environment descriptor for a third network environment.

14. The system of claim 10, wherein the at least one processor is further configured to categorize the second network environment with the first network environment responsive to the first environment descriptor and the second environment descriptor being within a similarity threshold.

15. The system of claim 10, wherein the at least one processor is further configured to provide the performance model by correlating the plurality of feature vectors identified from across the plurality of network environments, with the corresponding performance metrics.

16. The system of claim 10, wherein the at least one processor is further configured to generate a distribution of the first expected performance metrics for at least the first network environment, using the first expected performance metrics for at least the first network environment.

17. A non-transitory computer readable medium storing instructions that when executed cause at least one processor to:
identify plurality of feature vectors each identifying a corresponding performance metric corresponding to access by one or more clients via at least one of a plurality of network environments to an application hosted on a server;

provide a performance model using the plurality of feature vectors and the corresponding performance metrics;

determine, using the performance model, first expected performance metrics corresponding to access of the application by at least one first client via at least a first network environment;

generate, based at least on the first expected performance metrics, a first environment descriptor for at least the first network environment to be used by the at least one first client to access the application; and determine a similarity metric between the first environment descriptor of the first expected performance metrics and a second environment descriptor of second expected performance metrics for a second network environment to be used by at least one second client.

18. The non-transitory computer readable medium of claim 17, wherein the instructions cause the at least one processor to categorize the second network environment with the first network environment responsive to the first environment descriptor and the second environment descriptor being within a similarity threshold.

* * * * *